US008162201B2

(12) United States Patent
Gomes Fernandes

(10) Patent No.: US 8,162,201 B2
(45) Date of Patent: Apr. 24, 2012

(54) METHOD FOR LAYING PIPELINE USING MOTORIZED ELEMENTS

(76) Inventor: Paulo Roberto Gomes Fernandes, Rio De Janeiro (BR)

( * ) Notice: Subject to any disclaimer, the term of this patent is extended or adjusted under 35 U.S.C. 154(b) by 0 days.

(21) Appl. No.: 12/744,482

(22) PCT Filed: Mar. 4, 2009

(86) PCT No.: PCT/BR2009/000054
§ 371 (c)(1),
(2), (4) Date: May 25, 2010

(87) PCT Pub. No.: WO2009/109021
PCT Pub. Date: Sep. 11, 2009

(65) Prior Publication Data
US 2010/0316448 A1  Dec. 16, 2010

(30) Foreign Application Priority Data
Mar. 5, 2008 (BR) .............................. P10800385-8

(51) Int. Cl.
- *B23K 31/02* (2006.01)
- *B23K 1/14* (2006.01)
- *B23K 9/00* (2006.01)

(52) U.S. Cl. ................. 228/212; 228/49.1; 219/59.1
(58) Field of Classification Search ............. 228/49.3, 228/44.5, 212; 166/77.51, 85.1; 219/59.1
See application file for complete search history.

(56) References Cited

U.S. PATENT DOCUMENTS

| | | | | |
|---|---|---|---|---|
| 1,922,913 A | * | 8/1933 | Free et al. ................. 219/59.1 |
| 3,241,224 A | * | 3/1966 | Banister et al. ............. 29/429 |
| 3,644,695 A | * | 2/1972 | Shuey et al. ................ 219/611 |
| 3,720,069 A | * | 3/1973 | Lockridge ................. 405/166 |
| 3,744,259 A | * | 7/1973 | Wagley ..................... 405/174 |
| 3,745,319 A | * | 7/1973 | Unigovsky et al. .......... 219/101 |
| 3,882,299 A | * | 5/1975 | Sciaky ..................... 219/60 R |
| 3,900,146 A | * | 8/1975 | Fowler ..................... 228/103 |
| 4,130,925 A | * | 12/1978 | Gibson .................... 405/174 |
| 4,286,137 A | * | 8/1981 | Thome ................... 219/121.13 |
| 4,378,086 A | * | 3/1983 | Wascat ..................... 228/4.1 |
| 4,486,123 A | | 12/1984 | Koch et al. |
| 4,605,151 A | * | 8/1986 | Brown ..................... 228/2.3 |
| 4,765,776 A | * | 8/1988 | Howson .................... 405/169 |

(Continued)

FOREIGN PATENT DOCUMENTS
GB  1585764  3/1981
(Continued)

OTHER PUBLICATIONS www.davicorpipelinerollers.com, http://web.archive.org/web/20070907192648/http://www.davcorpipelinerollers.com/Overview/overview.html, Sep. 2007.*

(Continued)

*Primary Examiner* — Kiley Stoner
*Assistant Examiner* — Carlos Gamino
(74) *Attorney, Agent, or Firm* — Pearne & Gordon LLP

(57) ABSTRACT

The present invention consists in a system and a method for installation of duct lines and/or pipelines comprising a pipe shop, supporting, rolling and guiding elements previously provided along a path of duct line/pipeline designed to be formed, the quantity of elements varying according to the length and the characteristics of the path, the said pipe shop comprising within the same a facility for welding, inspection and finishing of the pipes for forming the duct line/pipeline, the elements comprising a supporting base and a roller.

7 Claims, 12 Drawing Sheets

U.S. PATENT DOCUMENTS

| | | | | |
|---|---|---|---|---|
| 4,907,732 A * | 3/1990 | Jones | 228/44.5 |
| 4,910,374 A * | 3/1990 | Lebedev et al. | 219/101 |
| 5,044,825 A * | 9/1991 | Kaldenbach | 405/166 |
| 5,364,013 A * | 11/1994 | Scheuerman | 228/212 |
| 5,482,404 A * | 1/1996 | Tenbusch, II | 405/184 |
| 6,262,403 B1 * | 7/2001 | Tsuchiya et al. | 219/607 |
| 6,364,011 B1 * | 4/2002 | Bergeron | 166/77.51 |
| 6,671,953 B2 * | 1/2004 | McAninch et al. | 29/868 |
| 7,161,115 B2 * | 1/2007 | Stecher et al. | 219/123 |
| 7,765,685 B2 * | 8/2010 | Brown | 29/819 |
| 2003/0039509 A1 | 2/2003 | McIvor | |
| 2006/0110219 A1 * | 5/2006 | Puttmann | 405/183.5 |
| 2007/0221385 A1 * | 9/2007 | Braun et al. | 166/379 |
| 2010/0287957 A1 * | 11/2010 | Liu | 62/50.7 |
| 2011/0030942 A1 * | 2/2011 | Orgeron | 166/77.51 |

FOREIGN PATENT DOCUMENTS

| | | |
|---|---|---|
| JP | 10002191 A * | 1/1998 |
| WO | 03/036153 A1 | 5/2003 |

OTHER PUBLICATIONS www.pipelineroller.com, http://web.archive.org/web/20071010081823/http://www.pipelineroller.com/single_double.html, Oct. 2007.*

* cited by examiner

METHOD FOR LAYING PIPELINE USING MOTORIZED ELEMENTS

SUMMARY OF THE INVENTION

The present invention consists in a system for supporting, laying and directing ducts for building duct lines and/or pipelines and a method for installation of duct lines and/or pipelines.

The present invention is aimed at solving the problems and difficulties associated with the use of the traditional assembling methods for situations in which there exist conditions of restricted access and difficulty in mobilizing equipment and manpower, as well as welding and inspection positions that present difficulties or entail risks of accidents.

The method according to the present invention provides a substantial reduction of the time involved in the process of assembly of pipework, eliminating the need of direct handling of the pipes during the definitive positioning thereof in the line, and further reducing the exposure of the rigging team to unhealthy and/or hazardous conditions.

BACKGROUND OF THE INVENTION

The duct lines and pipelines are lines used for carrying fluids, such as hydrocarbon oil and derivatives, chemical products, alcohol and water, which according to their application are designated as oil pipelines, gas pipelines, aqueducts, polyducts or alcohol ducts. Such flow lines are built using mid-sized and large-sized pipes that extend over great distances overland.

The method of building duct lines/pipelines in general consists in the building of pipes, the distribution thereof along their intended trajectory and the assembly of the distribution line by connecting the pipes to one another.

Many difficulties are encountered while building such type of distribution line in view of the large size of the pipes employed for that purpose and the environmental, geographical and weather constraints that must be overcome, and in this regard it is necessary to make use of large and heavy equipment to move and lay the pipes in place.

The traditional method used to assemble ducts intended to carry fluids (oil pipelines, adductors, gas pipelines, ducts for other derivatives, water mains, etc.) consists in transporting the pipes of convenient length for each use until the assembly site where they are placed forming a line (in an arrangement approximately parallel along the course of the line and near their respective positions in pre-joined sets) by means of welding. The operations of positioning and adjustment for welding are performed at the definitive location, and therefore the rigging team is itinerant, performing their work from point to point along the course of the line as the pipeline advances. To that end, there are crated new accesses to each point, the equipment must be transported, the installations must be disassembled and reassembled at new positions entailing frequent logistics difficulties, implying a substantial increase in costs, risks, and particularly of work time. Bad weather conditions, in such context, almost always cause the work to be interrupted.

In a great number of cases, however, it is noted that the traditional method requires that the pipes (or ducts) be transported to locations of difficult access, or unhealthy or hazardous, and furthermore, the assembly operations consisting in positioning, welding, tests and quality checks, etc. are performed at the locations where each length of pipe will be definitively installed, which might be quite difficult or even impossible depending on the particular situation, causing an increase in performance delay, loss of quality, costs, personal risks, material risks and environmental hazard.

The known methods of building duct lines/pipelines require the work site to be mobile and follow the team in charge of performing the welding of the ducts that are aligned in the place where they will stay when the duct line is finished. This requires the creation of access ways to the welding points between ducts, often requiring expropriation of real property or the establishment of rights of way, rendering the building work more expensive and delaying the same.

The project of construction of duct lines/pipelines encounters situations where the trajectory of the line passes through tunnels, galleries, and congested industrial facilities.

In such cases, according to the processes commonly used in the art, there is performed a partial or total disassembly of the existing facilities and the reassembly thereof subsequently to the building of the distribution line, often with a consequent interruption of production.

One other factor that interferes with the traditional systems for laying duct lines/pipelines consists in lengths of the trajectory of such distribution lines with geological or topographical hindrances that limit the transit of heavy equipment or being even devoid of any condition of access for performance of work in the installation site, such as crossings through marshy locations, snow, ice, areas with human occupation, archaeological sites, etc.

The above mentioned factors generally determine the definition or alteration of the paths to be followed by the lines, with major implications in terms of cost, time and logistics.

One other approach used in an attempt to overcome the above described problems, and which also constitutes a classic formula for assembling duct lines/pipelines, consists in joining a certain number of pipes, forming a longer section of piping, and subsequently, by means of the operation known as "pull" or "drag", move the said assembled section to weld the same in its definitive position or simply to allow the addition of new pipes. The operation is carried out with the aid of traction provided by cables (normally wire ropes), coupled to a winch, dragging the section or moving the same over provisional rolls installed under the piping.

The main limitation of that method resides in the fact that the transported lengths must be relatively short, in order to keep the forces and mechanical demands generated by the traction within acceptable limits. Furthermore, the available lengths of the cables might impose limits on the distance to be traveled. For distances that are longer than the length of the cables, the traction device will have to be repositioned, which usually entails a procedure that is lengthy, expensive and not always feasible.

The classical methods of construction of duct line/pipelines still present other disadvantages when such lines are built in confined environments such as galleries where the height of these latter does not allow the access of the equipment required to handle mid-size to large-size piping, in addition to not constituting an adequate work environment for the professionals, who when working in such environments are frequently forced to adopt straining positions and are exposed to an absolutely unhealthy environment due to the gasses generated by the pipe welding operation itself.

One instance in which the system and method of the present invention find an immensely advantageous application consists in the construction of duct lines/pipelines over ships loading/unloading piers. In these cases, the pipelines run across distances over the water, on structures specifically built to support the same.

The assembly of duct lines/pipelines using known techniques is often carried out from barges wherefrom the pipes are laid, entailing significant logistical disadvantages, weather constraints and personal risks. If there is made an option to perform the assembly by pulling or dragging there must be made available winches, the traction stations must be repositioned, there must be run the risks inherent to the handling of wire rope and of damage to the piping. Furthermore, the welding of the spanning sections will have to be done over water, with all inconveniences entailed thereby.

By means of the system according to the present invention, the assembly of the piping becomes a remote operation and the installation thereof becomes sequential, using preassembled elements, thereby avoiding the above described hindrances.

One other example in which the system according to the present invention evidences an advantage is the assembly of a line inside a tunnel of circular cross section and low height, where the absence of proper work conditions and the confined environment render difficult the use of classical techniques.

DESCRIPTION OF THE INVENTION

The present invention refers to a system and a method for assembling and installing duct lines/pipelines such as oil pipelines, gas pipelines, aqueducts, polyducts and alcohol ducts for transporting and distributing hydrocarbon oil and derivatives thereof, water, alcohol, chemicals and similar products, wherein the pipes are built, joined and inspected in one sole fixed site or work facility, that is, in a logistics yard for construction and welding of pipes, a pipe shop, with a fixed location.

With the present invention, the entire logistics effort is concentrated and centralized in the fixed yard or shop (pipe shop) for receiving and stocking the ducts, for inspection, painting and welding of the pipes for building the line.

In the present invention the piping with its definitive composition, upon being subjected to the integrity checks, is launched (or laid) over the supporting elements with rollers previously provided along the entire extension of the path.

The supporting elements according to the present invention are permanently integrated to the duct line/pipeline and perform the dual function of provision of support and of driving elements that promote the movement and transportation of pipes, of sections of pipes or of the duct itself already in its final installation position.

With the system for construction of duct lines/pipelines according to the present invention the distribution line permanently installed on the supports provided with rollers, when subjected to variances in the temperature gradient, either from weather changes or from the temperature of the fluid carried therein, will be free to expand and contract thermally, without entailing thereby any consequences to the line supporting structure or to the pipe itself.

The system according to the present invention comprises, in its basic modality, the installation of elements for support and displacement of the piping along the designated path for the said duct line/pipeline, and also a fixed logistics yard, a pipe shop, for construction and welding of pipes, where the pipes are joined and inspected. This stationary pipe shop will work in a continuous process of alignment and welding, providing the piping itself to be inserted in the path of the line by means of the driving support elements that transport and support the duct/line along its definitive trajectory.

The assembly of the piping to be installed in the pipeline/duct line according to the present invention consists in the welding of the pipes, which may be automatic or not, in the welding inspection, in the addition of pipe segments to the resulting piping while the said piping is inserted into the duct line/pipeline over the supporting and transport elements provided longitudinally along the axis of the line. The piping is pushed along the duct line/pipeline by the driving force provided by the very elements of support and displacement, which in a synchronized manner move the piping along the predefined path of the line.

In the system according to the present invention, the supports of the duct line/pipeline, whereupon the piping rests, are provided with rollers with individual motor drive means. The driving of the rollers provided in the various supports along the path induces the longitudinal movement of the piping supported thereon along the line path axis.

In the system according to the present invention, the movement of the piping along the path of the line is provided by drive rollers dispensing the use of forces external to the system and also dispensing the use of additional equipment for moving, transporting and positioning the pipes.

The said rollers provided for the system according to the present invention are used to direct and transmit movement to the piping during the process of advancement thereof, and each support may comprise one or more rollers to provide the desired orientation to the piping.

The system according to the present invention further provides the use of as many supports and rollers as may be deemed necessary to warrant proper support and precision guiding along the path thereof when the piping is being advanced.

The system according to the present invention may be used in a line with a layout comprising downgrade paths, upward slopes, horizontal or vertical paths.

Furthermore, the present system provides a guide element to be installed at the end of the piping, the said element serving, as designated, to facilitate the centralization of the pipe upon entering the rollers of the following support. It should be pointed out that the cited inventive method does not depend exclusively on supports and/or drive rollers, and the longitudinal transport/advancement of the pipes, sections and/or completed ducts may be performed 100% in the horizontal direction, along upward slopes, along downgrades and even 100% in the vertical direction, extending to devices using magnetic fields, supports using superconducting materials, pneumatic means or mutually opposed rollers.

Differently from the prior art, the system according to the present invention dispenses the displacement of the "work site" along the path during the installation of the piping, and further solves the hardships of installation of duct lines/pipelines in locations of difficult access or saturated environments Furthermore, the system according to the present invention provides enhanced safety and comfort in connection with the processes of welding and inspection, that are performed at one sole fixed site or facility (pipe shop) and providing, in an obvious manner, better conditions for performance of such operations, thereby allowing the achievement of a better quality of the resulting service.

With its obvious improvement over the prior art, the system according to the present invention provides better installation conditions, and is incomparably simpler and more functional, in addition to being safer and faster.

The system according to the present invention may further provide a modality where the supports of the duct line/pipeline are provided with rollers driven by their own powering means, whereupon the piping is laid to rest. The driving of the rollers of several supports, provided in combination and synchronized, indices the longitudinal movement (along the axis of the duct line) of the piping supported thereon, dispensing the use of forces external to the system for the displacement, alignment and final positioning of the ducts to be built and installed.

The power means or drive means for the rollers include a motor operably connected to the roller to achieve displacement, alignment and final positioning of the duct line/pipeline as it is constructed and installed.

In the present inventive method, each piping/duct supporting element constitutes a unit that includes a frame and bearings, which may have any geometrical shape that might be convenient for the specific circumstance of the line design, one or more rollers, that perform the triple function of supporting, directing and driving/moving, the transmission means (reducer and couplings) and a motor (preferably an electric motor). A possible motor variant consists in the use of a motor-reducer unit, which incorporates both functions of motor and reducer. If deemed convenient for the characteristics of the duct line/pipeline, the said supporting rollers, upon having performed their function of piping moving and handling elements during the assembly phase, will remain installed and will serve as means for definitively supporting and securing the line.

The present invention further refers to a method of assembly, whereby the building, laying and installation of piping for carrying fluids are performed at a fixed location, a logistics yard of construction and welding of pipes, such method comprising the main steps of:

a) installation of elements for supporting, aligning and carrying the piping along the pipe shop and extending along the previously defined course of the duct line/pipeline;

b) welding, at a fixed site or facility (pipe shop) of the pipes for forming the piping/duct;

c) checking of integrity and quality of the welds (inspections), still at the fixed yard or facility; and d) conveyance or advancement, from the pipe welding station, of the piping or of the duct/line itself over the supporting elements, by driving the piping supporting elements, which are provided with rollers and self-powering means, whereby the piping is directed and guided by the said supporting elements, with the advancement being provided by means of traction of the piping;

The method of assembly, therefore, consists in the anticipated installation of the supports, the driving supports and power facilities o be used in the process (for example, electric power, magnetic power, etc.) along the axis of the duct line, there being further foreseen the provision of alternating drive rollers and driven rollers.

The infrastructure (pipe shop) is mounted at a fixed work site or facility that will be preferably located at one or both ends of the section wherein the line will be installed, wherein is provided and concentrated all the equipment required for receiving/inspecting the pipes, storage and stocking, operations intended for alignment of lengths of pipe, subsequent welding, painting and final inspections.

At the fixed yard (pipe shop), the pipes are transferred from storage, provided in the alignment intended for the duct line/pipeline and positioned for welding. This operation can be carried out pipe by pipe, or there may be composed longer sections, with several pipes, prior to the provision of advancement or displacement of the assembled section.

When a pipe or section is ready for definitive assembly, there is provided the displacement thereof, juxtaposing the same to the already assembled piping, whereto it is welded, there being subsequently conducted the necessary inspections and checks (ultrasound inspection, X-ray inspection, etc.), and subsequently the driving supports are driven, causing the entire piping, previously assembled, to move forward, opening a space for inclusion of new pipe sections.

Thereby, all operations including handling, welding (either or not they are performed in automated fashion) and inspection, are concentrated and performed at a fixed location, thus obviating the need to perform such operations along the line, under the action of storms and in dependence of local topography.

In order to provide a clearer understanding of the system for building duct lines/pipelines according to the present invention, there will be provided below a description with reference to the figures, wherein.

Figure 26:
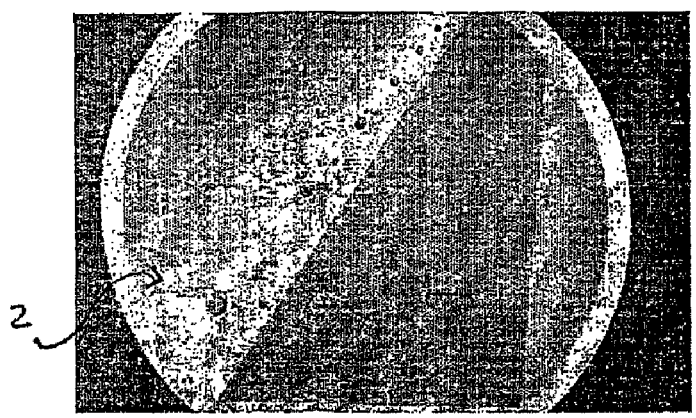
Figure 27:
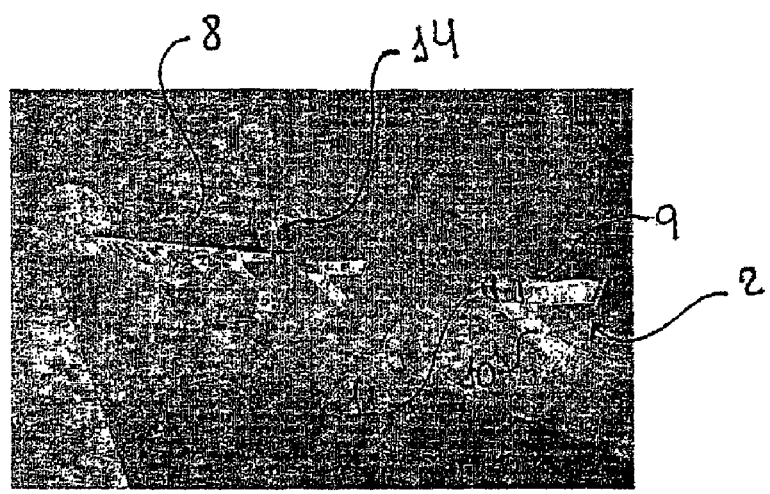
Figure 28:
Figure 29:
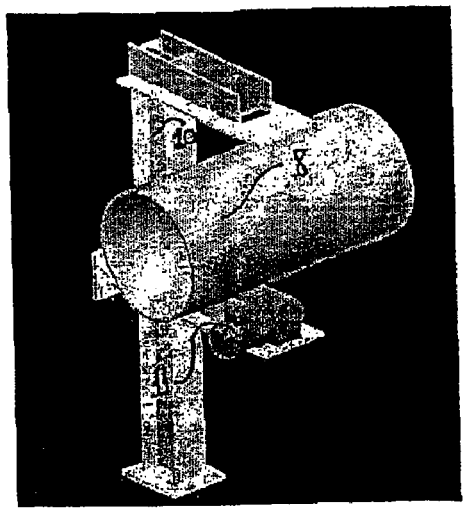
Figure 30:
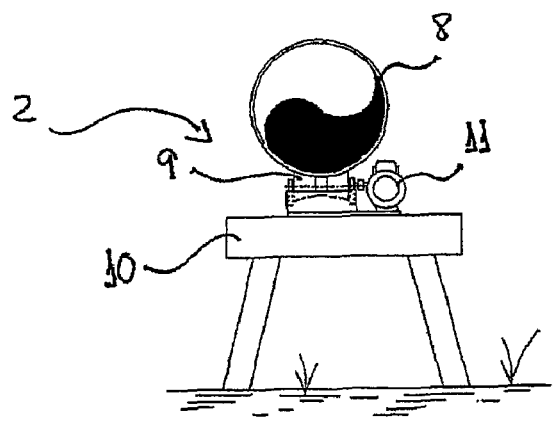
Figure 31:
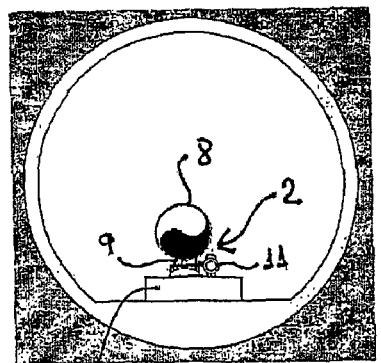
Figure 32:
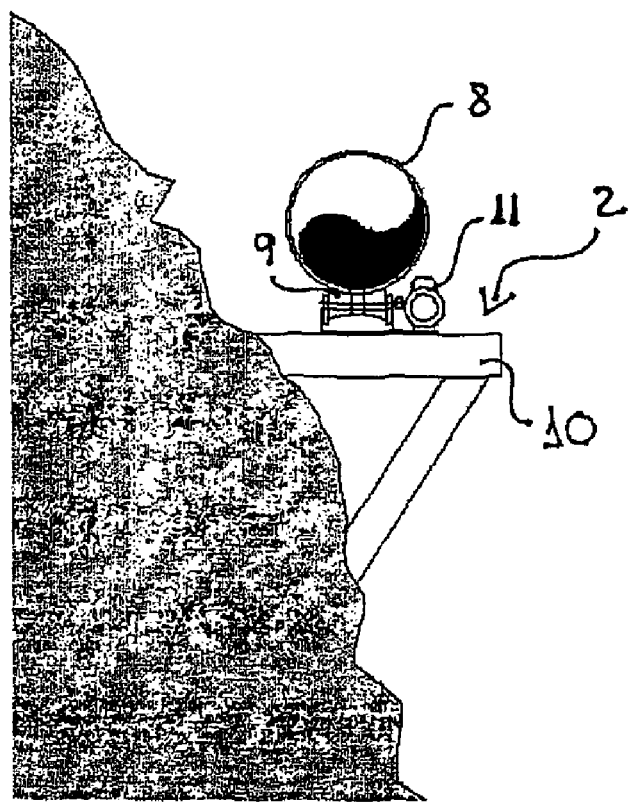
Figure 33:
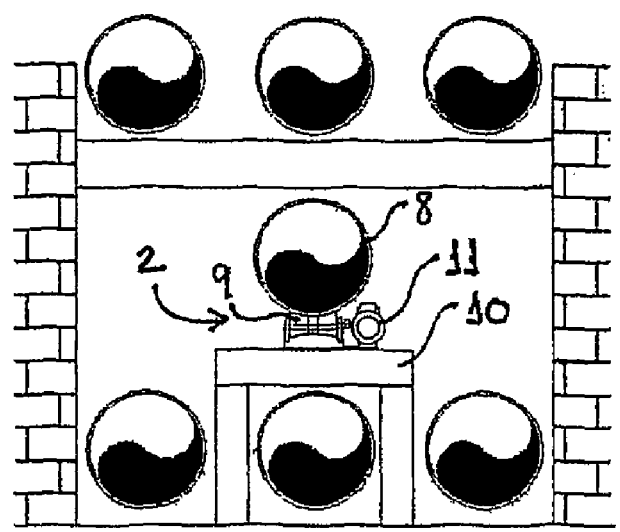

FIGS. 26 to 28 show a duct line/pipeline built passing inside a tunnel or gallery of round cross section, the line being suspended from the wall thereof, and particularly on the left side of FIG. 26 there is shown the motorized supporting element previously installed and ready to receive and carry the piping, and in FIG. 27 there is evidenced the piping at the stage of being laid through the tunnel over the elements following the course of the line;

FIGS. 29 and 30 show two constructions where the supporting and moving elements are placed on suspended structures, where the construction of FIG. 30 is appropriate for marshy or flooded areas, for crossing of rivers and maritime and river piers;

FIG. 31 shows an installation of pipeline/duct line passing inside a tunnel or gallery of circular cross section, supported on a base along the structure;

FIG. 32 shows a pipeline/duct line built on a cantilevered platform mounted on a steep incline, in a situation of extremely difficult performance, to wit, the passage of the piping by hillsides where there are normally no conditions to perform the operations or to lay down the material;

FIG. 33 shows the building of the duct line/pipeline crossing a congested gallery, wherein the assembly of the piping might require the prior disassembly of other lines.

According to the system and method of the present invention, there are provided elements (2) for supporting, guiding and transport, which comprise supports (10) with mechanical devices or units provided with rolling supports, more specifically rollers (9) which function is to allow and/or promote the lengthwise movement of the pipes (5) and piping sections (8) in the direction of the axis of the duct line/pipeline to warrant free transit of pipes (5)/piping segments (8).

In the system according to the concept of the present invention, along the path of the line, at positions alternating with the supporting elements (2) provided with self-powering means, drive means or motors (11), there is provided the use of supporting elements (2) with freely rolling rollers (9), that is, devoid of motor drive means, for provision of a combined arrangement in the supporting/carrying system, provided that this does not compromise the performance of the movement, achieving a reduction of complexity or cost.

The supports (10) with drive means (11), in the present invention, are units that comprise one or more rollers (9), support bearings or structural mechanical components that perform that function, motor speed reducer(s), and eventually, control/command units for those motors.

As noted above, those support and transport elements (2) may have various constructions, in order to achieve the desired effect on the piping in specific project situations. Without exhausting the scope of possible arrangements, there may be employed supporting and holding elements (2) aimed at directing the piping to follow a lateral or vertical orientation, for increasing the traction power of the rollers (9) with drive means (11), for reducing structural strains on the side of the pipe, for balancing loads, etc.

Similarly, several arrangements may be employed regarding the motor drive units, drive means or motors (11) of the elements (2). There may be used various arrangements of the motor/reducer assembly, in addition to the possibility of use of integrated motor-reducer units—with integrated motor and reducer. There may be used, a reducer coupled by a flange directly to the support bearing, with independent shaft and independent bearing, with or without elastic coupling, with the motor provided at an angle of 90 degrees or coaxial relatively to the roller, etc., as illustrated by way of example in FIGS. 17 to 23 that integrate the present invention.

Preferred Embodiment

In the preferred embodiment, there are used supports with single or double rollers, made of polymer, driven by an electric motor-reducer, directly attached by a flange to the support, with the assembly process being unidirectional, as described above.

The system according to the present invention comprises a fixed pipe shop (1), supporting, rolling and guiding elements (2) previously provided along a path (4) of duct line/pipeline, the said pipe shop (1) comprising within the same a facility (3) for welding, inspection and finishing of the pipes to form the duct line/pipeline, the elements (2) comprising a supporting base (10) and a roller (2).

Figure 1:
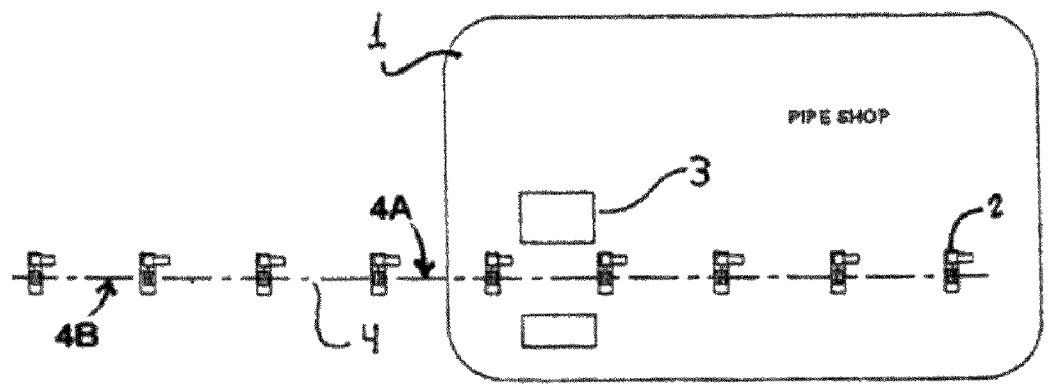
FIG. 1 depicts a fixed pipe shop (1), with the welding, inspection and finishing facilities, and with the supporting, rolling and guiding elements (2), of self-powered type, installed along the length of the path (4) of the duct line/pipeline.
Figure 2:
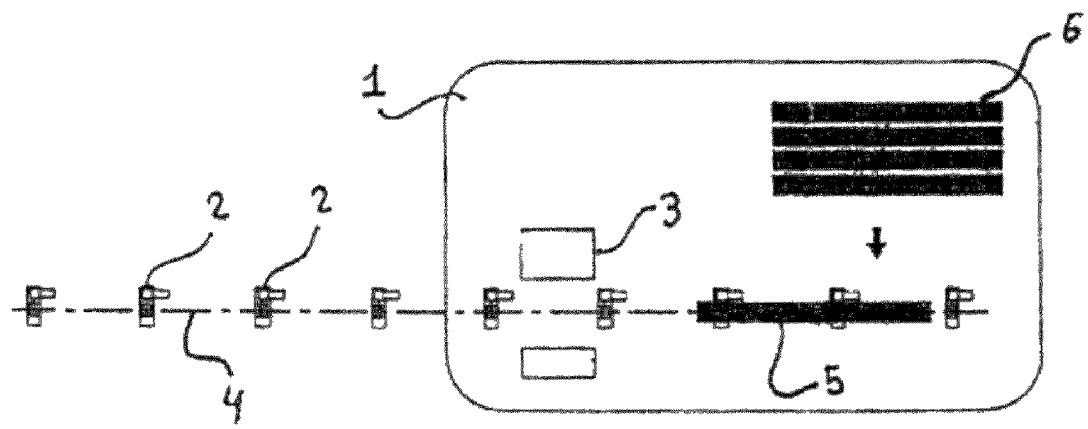
FIG. 2 shows the method according to the present invention at the step of feeding the pipe (5) from the "lung" stock (6) to the path (4), over the first supporting elements(2) at the pipe shop (1)
Figure 3:
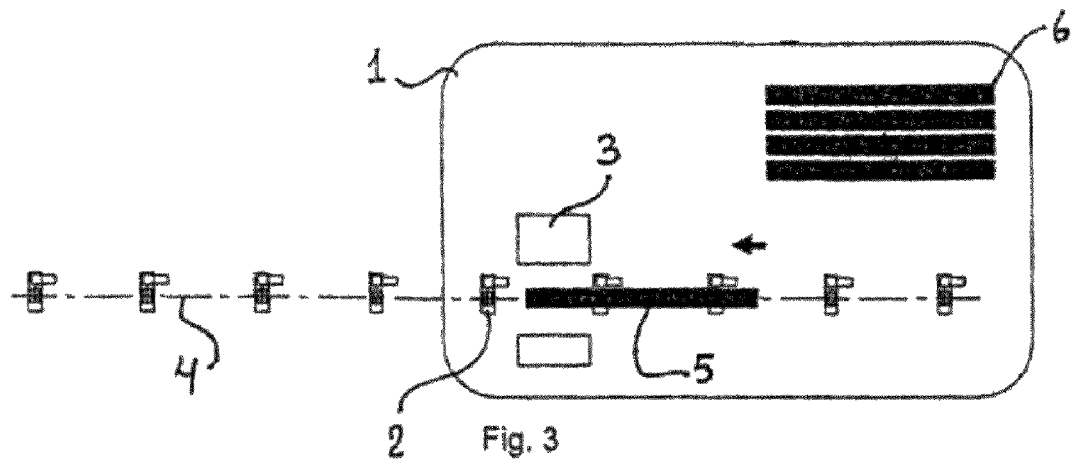
FIG. 3 shows the displacement of the pipe (5) over the elements (2) along the path (4) to a desirable position in the vicinity of the facility (3)
Figure 4:
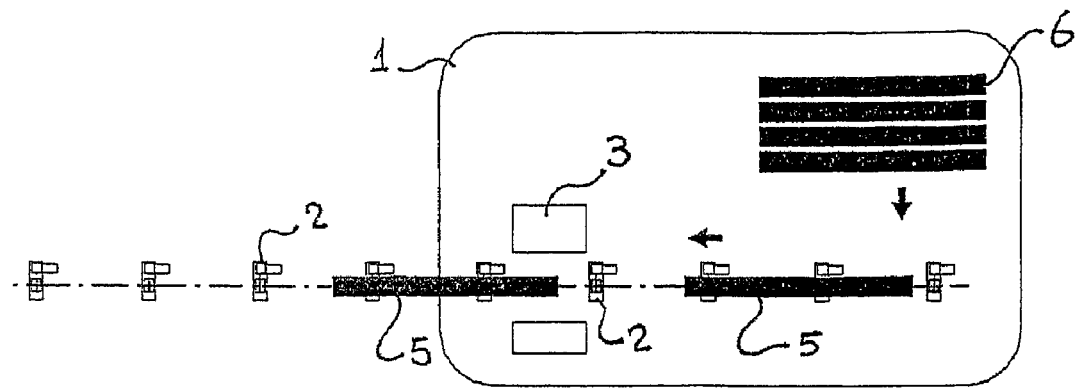
FIG. 4 shows the addition of a second pipe (5) to the path (4) and the displacement thereof over the elements (2) to reach a position near the previous pipe, by means of selective actuation of the driving elements of some initial supporting means (2)
Figure 5:
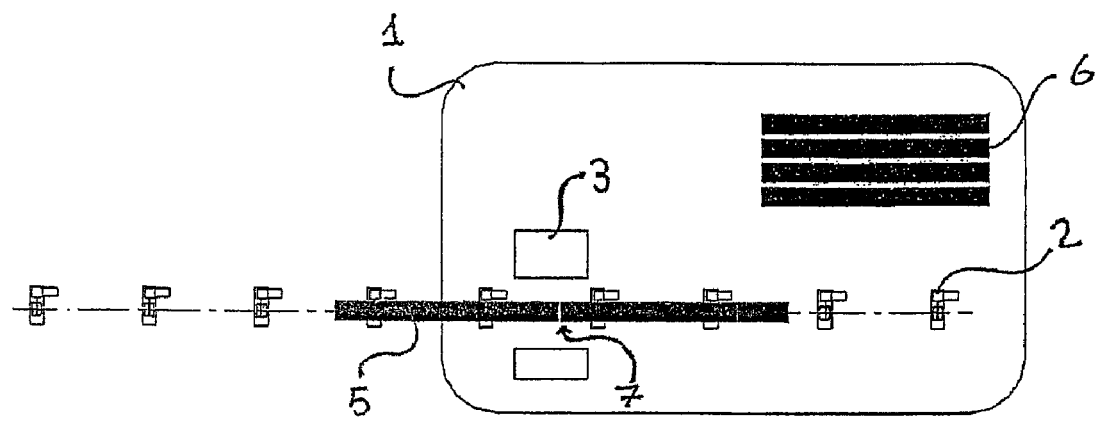
FIG. 5 illustrates the step of joining (7) of the pipes at the welding facility (3)
Figure 6:
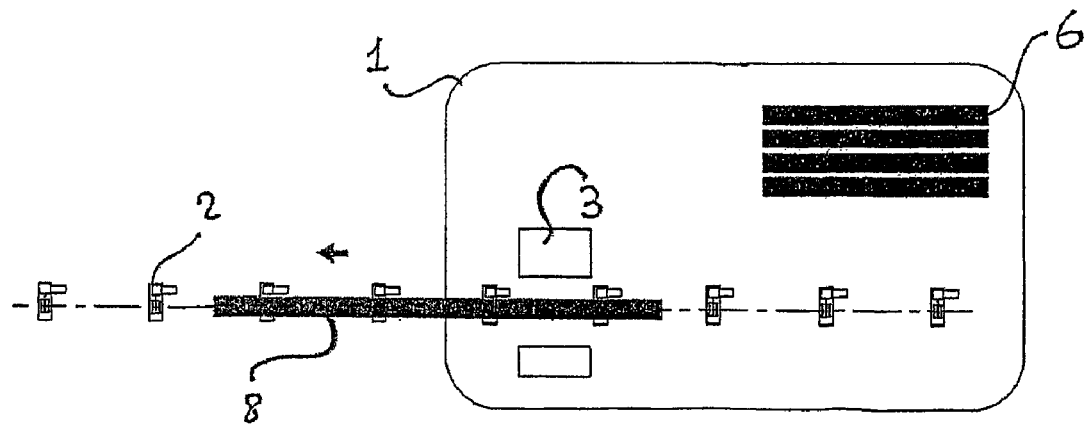
FIG. 6 shows the displacement of the piping segment (8) resulting from the joining of the pipes over the elements (2) along the path (4) to reach an advanced position and releasing the station to receive a new pipe section.
Figure 7:
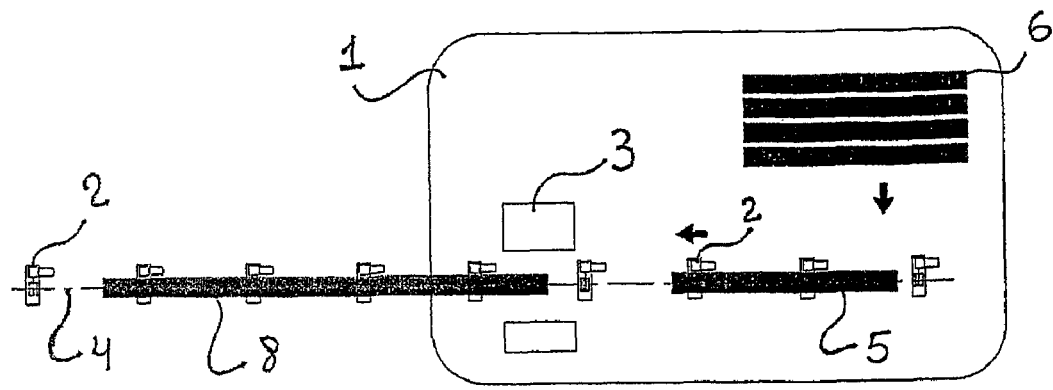
FIG. 7 depicts the addition of a further pipe (5) to the path (4) and the displacement thereof to an advanced position in the pipe shop for subsequent joining with the previous piping segment (8)
Figure 8:
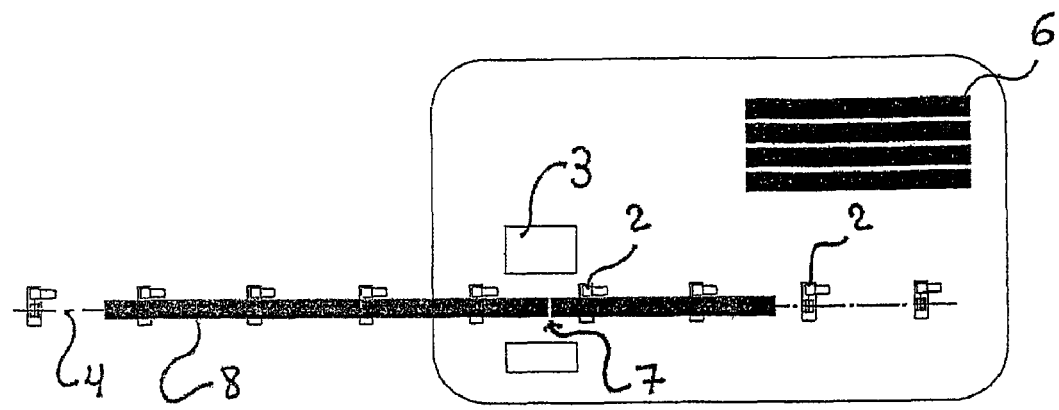
FIG. 8 shows the joining (7) of the pipe (5) to the piping segment (8) at the facility (3) in the pipe shop (1)
Figure 9:
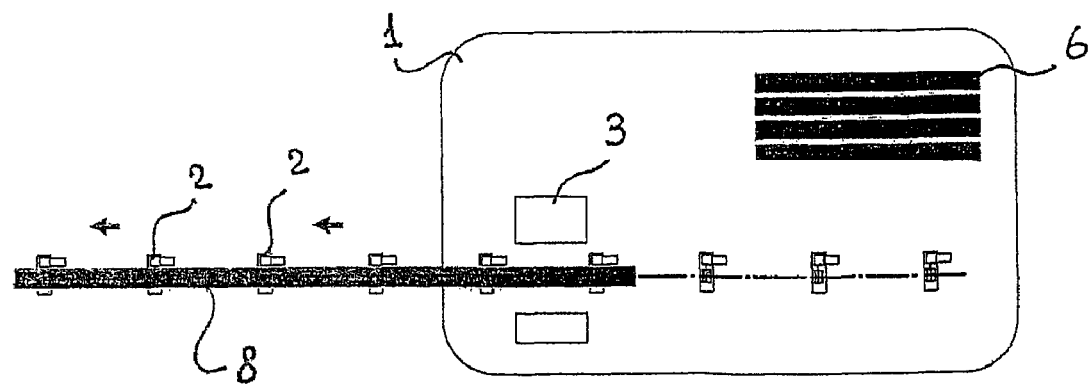
FIG. 9 shows the displacement of the already finished piping segment (8) to an advanced point of the path (4), over the elements (2)
Figure 10:
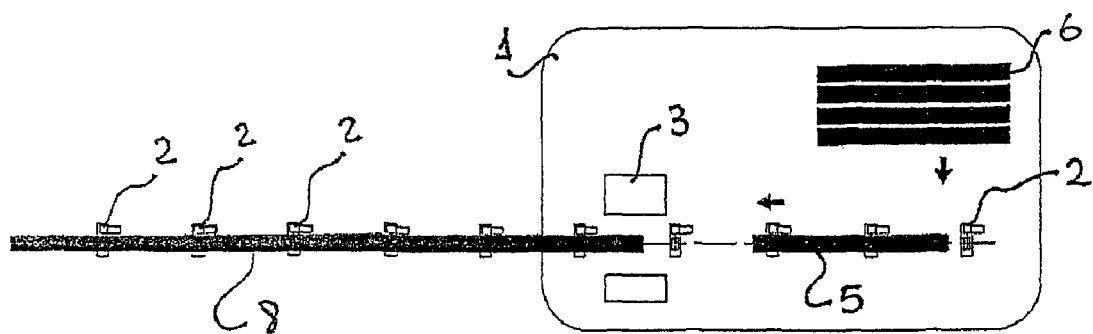
FIG. 10 shows the addition of one further pipe (5) and the displacement thereof along the path (4) and over the elements (2) to be joined at the facility (3) with the previous piping segment (8), already welded to the piping.
Figure 11:
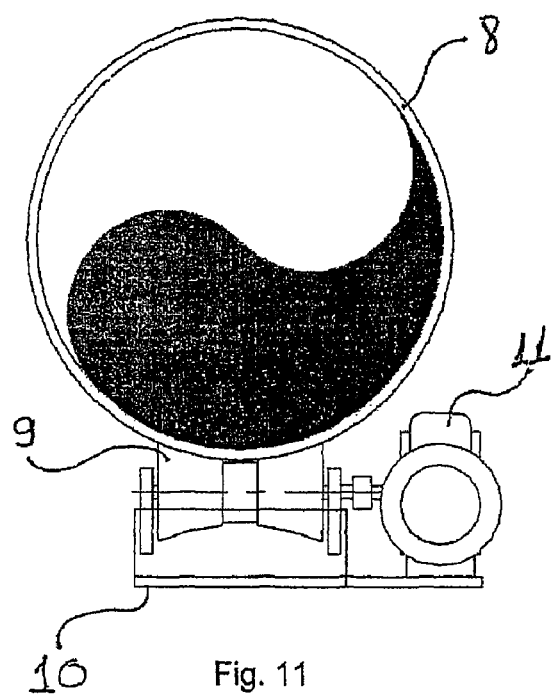
FIG. 11 depicts a piping segment (8) in cross section, evidencing parts of the supporting, rolling and guiding element (2), to wit: the driving motor (11), the supporting base (10) and the roller (9)
Figure 12:
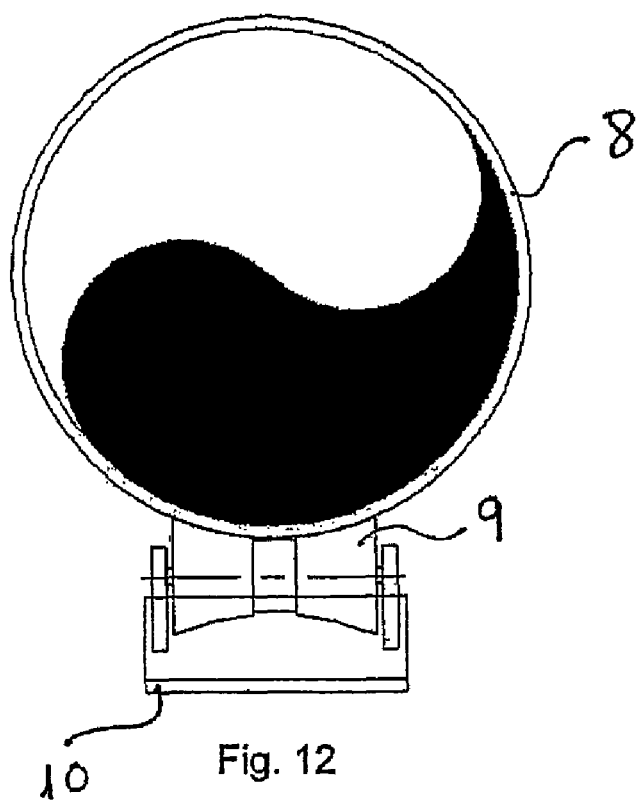
FIG. 12 shows a piping segment (8) in cross section evidencing parts of element (2)—the supporting base and the roller—without the motor (11)
Figure 13:
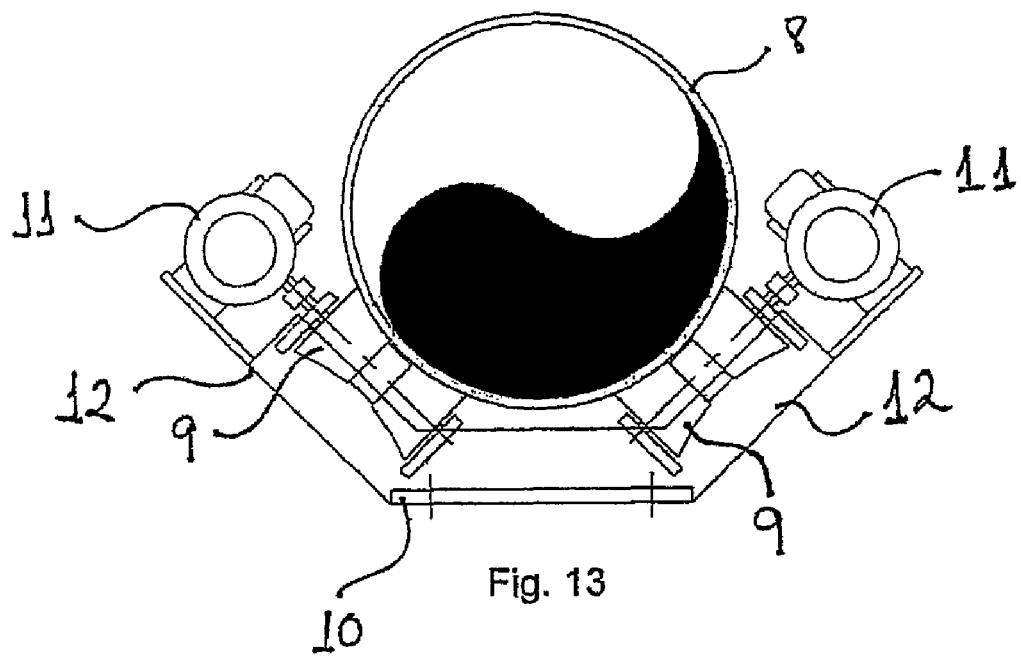
FIG. 13 shows a piping segment (8) in cross section, evidencing parts of element (2)—the supporting base (10) and rollers (9) with motors (11) coupled to rollers (9) in an oblique position, mounted on extension arms of the base (12), the oblique rollers (9) comprising independent motors (11) and drive means.
Figure 14:
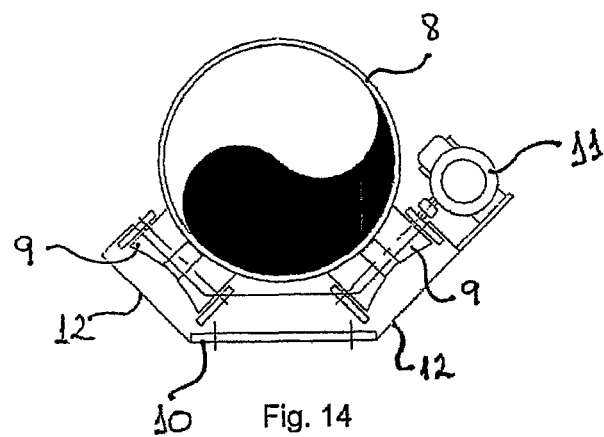
FIG. 14 shows an symmetric element (2) with motor (11) coupled to only one of the rollers (9) in an oblique position, mounted on extension arms of the base (12)
Figure 15:
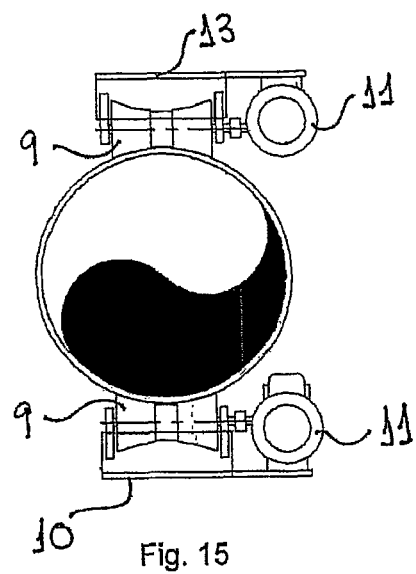
FIG. 15 shows an element (2) with lower and upper rollers (9), the upper roller being mounted on a supporting base (13), each roller comprising an independent driving motor (11)
Figure 16:
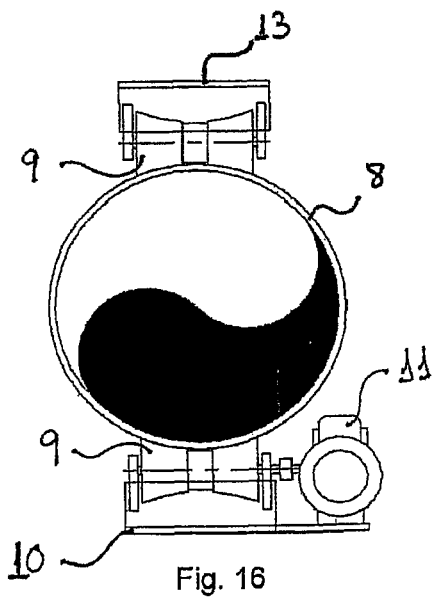
FIG. 16 illustrates a modality of the embodiment shown in FIG. 15, wherein the upper roller (9) mounted on a supporting base (13) does not have a motor (11)
Figure 17:
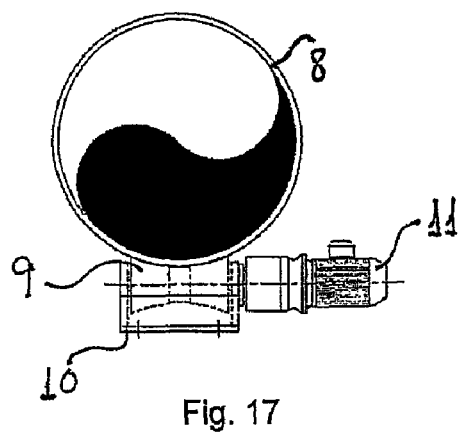
FIGS. 17 to 23 show various options of drive units and assemblies thereof in association with the element of support and displacement (2) of the piping.
Figure 18:
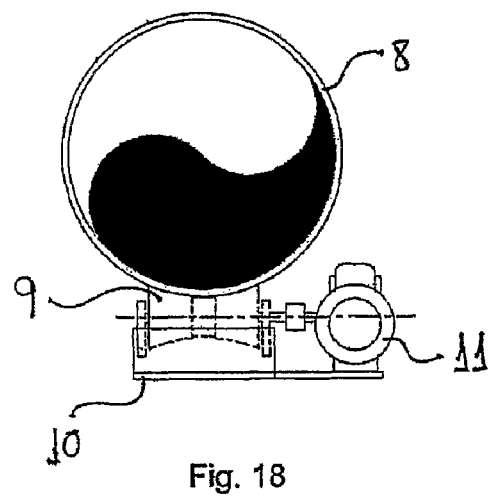
Figure 19:
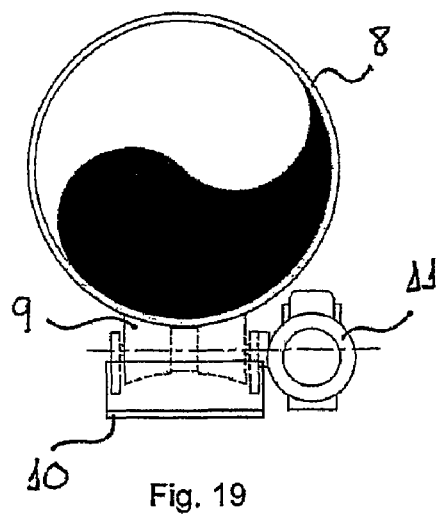
Figure 20:
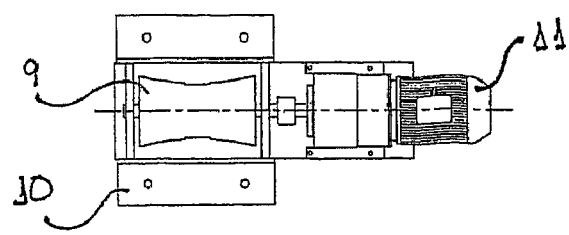
Figure 21:
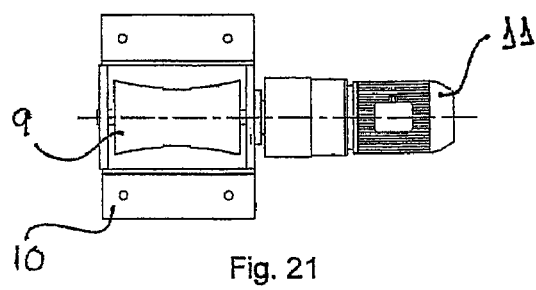
Figure 22:
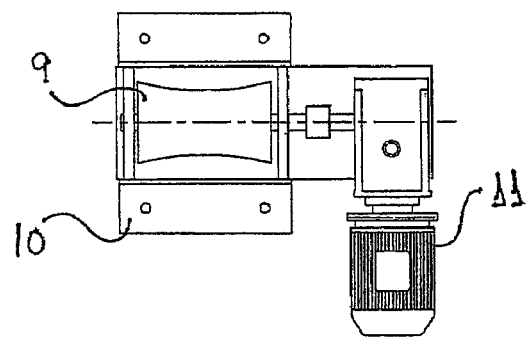
Figure 23:
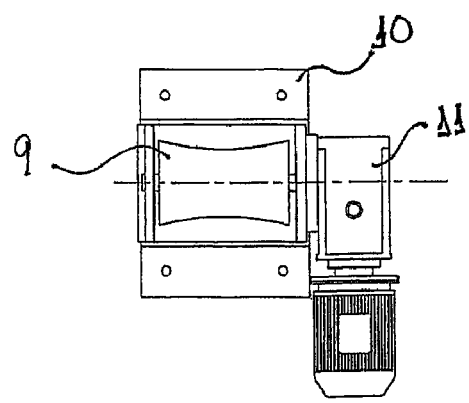

Alternatively, the system according to the present invention provides for one or more of the elements (2) to comprise one or more drive means or drive motors (11) and/or two or more rollers (9), the rollers (9) comprised in the elements (2) being further possible provided in various positions and angles in relation to the base (10). The elements having the function of directing and/or deflecting the piping in accordance with the course followed by the path (4), such course possibly constituting a downgrade course, an upward slope, or a horizontal or vertical course that are joined to provide a straight path portion (4A) and a connected divergent path portion (4B) as shown in FIG. 1. More particularly, the straight path portion (4A) extends in the plane of the drawing and the divergent path portion (4B) angularly extends downward into the plane of the drawing.

In the system according to the present invention, the pipe shop (1) comprises a store (6) for stocking the pipes (5) and a facility (3) for welding and checking and finishing operations.

The system according to the present invention provides alternatively the installation, at the end of the pipe located opposite the pipe shop (1), of a guide element (14).

The method according to the present invention comprises the following steps:

a) installation of a fixed pipe shop (1) with a pipe storage station and a shop station for the operations of welding, inspection and finishing of the pipe joints;

b) installation of power-driven supporting elements, along the pipe shop and extending along the path of the line for laying the duct line/pipeline;

c) placement of a pipe on the initial elements (2) of support and transport located in the pipe shop;

d) advancement of that pipe to the location of the welding, inspection and finishing shop (3);

e) feeding of a new duct to the initial section of the line;

f) advancement of the new duct to a position adjacent the previous pipe at the location of the welding facilities;

g) welding of those pipes, checking and finishing of the joint;

h) subsequently there is provided the advancement of the already assembled section until the end of the last pipe reaches the welding shop;
i) placement of another pipe (5) in the initial position over the initial supports at the pipe shop;
j) advancement of that new pipe to a position adjacent to the end of the already formed piping;
k) welding and integrity checking of the weld of the new pipe;
l) advancement, from the facility (3) in the pipe shop (1), of the resulting piping segment (8) over the self-powered elements (2);
m) and thence successively, adding and welding new pipes as the duct line is gradually formed by advancing the piping over the self-powered supports;
n) upon finishing the placement of the piping the supports remain in place and are definitively integrated to the duct line/pipeline;

Additionally, after step (7) the method according to the present invention includes a step of installation of a guide element (14) at the end of the pipe (5) on exiting the pipe shop (I) and along the direction of the path (4).

The method according to the present invention further provides, as an alternative, the inclusion of two or more rollers in the elements (2), each of the rollers comprising one or more traction motors (11).

Figure 24:
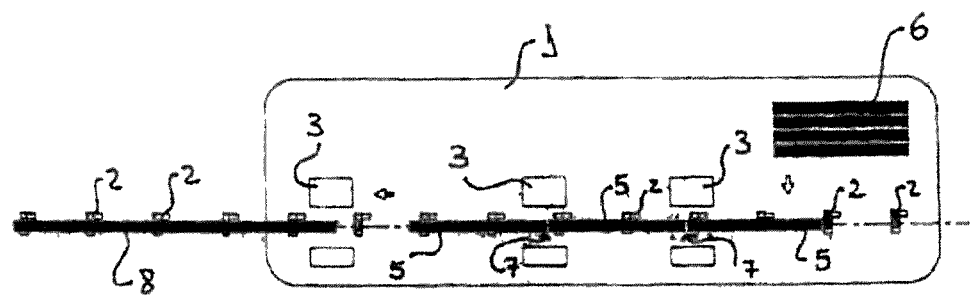
FIG. 24 shows a variation of the system for building duct lines/pipelines according to the present invention, whereby a longer section of pipe, comprised by more than one pipe length, is assembled prior to the joining thereof to the already assembled piping.

The present invention further provides the possibility of two or more pipes (5) being pre-welded, cleaned and inspected in independent facilities (3), with the welding operations of the section being performed simultaneously. Subsequently, the resulting segment (8) is connected to the already assembled piping segment (8). This alternative procedure is aimed at accelerating the process, allowing the laying of longer lengths at each cycle of the operation, and is illustrated in FIG. 24 of the present invention.

Figure 25:
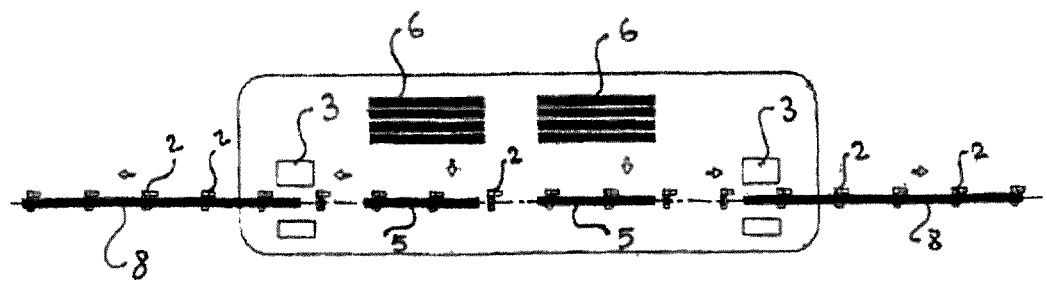
FIG. 25 shows another of the system for building duct lines/pipelines according to the present invention, whereby the self-powered supporting elements move in both directions.

In one other variation of the method according to the present invention, the piping segment (8) is laid in two directions from the same pipe shop (1). In this context, there may be provided more than one pipe shop, at strategic locations along the path of the line, enhancing performance and reducing the building time. Such alternative is illustrated in FIG. 25 of the instant patent.

The invention claimed is:

1. A method for installation of duct lines and/or pipelines along a path including a straight portion and a divergent portion that angularly intersects the straight portion, characterized by comprising the steps of:
a) providing and installing self-powered piping supporting, rolling and guiding elements, wherein each element includes at least one motor, that are separately movable for positioning at spaced locations along the path for construction of the duct line/pipeline from a fixed logistics yard of construction and welding of pipes;
b) feeding a first pipe over the elements in the logistics yard of construction and welding of pipes;
c) displacing the first pipe to a position at the logistics yard of construction and welding of pipes of the facility for welding, inspection and finishing;
d) adding a second pipe to the path over the elements at the logistics yard of construction and welding of pipes;
e) displacing the added pipe to a location adjacent to the end of the first pipe waiting at the welding station so that adjacent pipe ends are positioned for welding together;
f) welding the adjacent pipe ends and checking the weld integrity at the facility for welding, inspection and finishing at the logistics yard of construction and welding of pipes to form an arrangement of welded pipes;
g) advancing the arrangement of welded pipes formed in step (f) from the welding facility at the logistics yard of construction and welding of pipes with the self-powered piping supporting, rolling and guiding elements provided along the course of the path including directing and/or deflecting the welded pipes along the divergent portion of the path;
h) feeding additional pipe to the welding facility, welding the additional pipe to the end of the already assembled arrangement of welded pipes formed in step (g);
i) advancing the assembled arrangement formed in step (h) along the path;
j) successively repeating steps (f) through (i) until the arrangement of welded pipes reaches the end of the path, and combining the elements with the duct line/pipeline to provide a permanent support for the joined pipes along the path.

2. A method as claimed in claim 1, characterized in that the self-powered piping supporting, rolling and guiding elements include rollers engaging the piping and the steps of advancing are carried out by means of traction applied to the arrangement of welded pipes by the rollers.

3. A method as claimed in claim 1, characterized in that at least one of the self-powered piping supporting, rolling and guiding elements includes two or more rollers.

4. A method as claimed in claim 3, characterized in that at least one of the rollers is operably connected to the motor.

5. A method as claimed in claim 3, characterized in that at least one of the rollers is operably connected to two or more motors.

6. A method as claimed in claim 2, characterized in that the rollers include self-powered rollers powered by the said at least one motor and freely rolling rollers not provided with motor, and the traction of the assembly of welded pipes is performed by the self-powered rollers and the freely rolling rollers.

7. A method as claimed in claim 1, characterized by providing the forwarding of the assembly of welded pipes over the self-powered piping supporting, rolling and guiding elements in a first direction along the path and in an opposite second direction along the path, from more than one fixed logistics yard of construction and welding of pipes, installed at more than one location along the duct line/pipeline.

* * * * *

UNITED STATES PATENT AND TRADEMARK OFFICE
CERTIFICATE OF CORRECTION

PATENT NO.         : 8,162,201 B2
APPLICATION NO.    : 12/744482
DATED              : April 24, 2012
INVENTOR(S)        : Paulo Roberto Gomes Fernandes It is certified that error appears in the above-identified patent and that said Letters Patent is hereby corrected as shown below:

Column 10, line 4, after "with" insert --a--.

Signed and Sealed this
Seventeenth Day of July, 2012

David J. Kappos
*Director of the United States Patent and Trademark Office*